Dec. 23, 1930.  W. SCHOENFELD  1,786,130
HEATER FOR AUTOMOBILE ENGINES
Filed Dec. 17, 1928
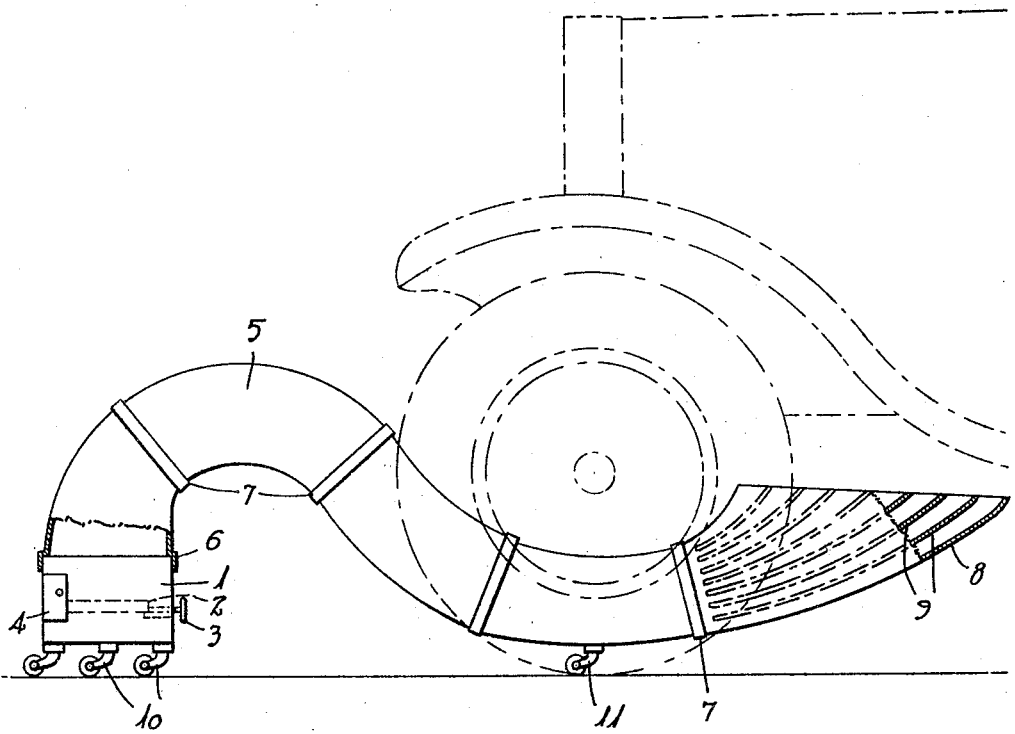
Inventor:
Walter Schoenfeld
By Monroe E. Miller
Attorney.

Patented Dec. 23, 1930

1,786,130

UNITED STATES PATENT OFFICE

WALTER SCHOENFELD, OF ST. PAUL, MINNESOTA

HEATER FOR AUTOMOBILE ENGINES

Application filed December 17, 1928. Serial No. 326,612.

The present invention relates to heaters for automobiles, and aims to provide a novel and improved heater for supplying heat below an automobile engine.

Another object of the invention is to provide a heater of the kind indicated including an oil stove or burner, in combination with a stove pipe of such form that the burner may be located beyond the automobile and that the products of combustion may be directed under the engine.

In supplying heat under the engine the same will warm up the metal parts of the engine, the water in the cooling system, and the oil and grease in the engine and transmission box, so that the engine will start easily in cold weather, as well as saving wear and tear on the mechanism.

The heater may be used wherever an automobile is left standing, whether in a garage or other shelter, or out-of-doors. The heater is especially desirable for use in starting the motor in cold weather, particularly when the battery has been run down and hand-cranking is necessary. The heater is also inexpensive to manufacture, and in burning oil is also inexpensive in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein the figure is a side elevation of the improved heater, portions being broken away and shown in section, and the front end portion of an automobile being shown in broken lines.

Any suitable oil stove or burner 1 may be used, having the wick 2 and suitable wick adjusting means 3 for regulating the flames. The stove has a door 4 to permit the wick to be lighted.

In carrying out the invention there is provided a stove pipe 5 in the form of a compound curve. Its receiving end has a slip joint 6 with the stove 1, so that the products of combustion are delivered into the pipe.

It is preferable to construct the pipe 5 in sections with slip joints 7 between the sections, in order that the pipe may be more compactly shipped and stored away.

The delivery portion or section 8 of the pipe is flared and has diverging deflectors 9 therein to spread the products of combustion under the automobile engine, the discharge portion 8 of the pipe being directed upwardly.

The stove 1 and lowermost portion of the pipe 5 are mounted on the respective casters 10 and 11, in order that the heater may be conveniently moved about on the floor, pavement or ground.

The pipe 5 extends upwardly and to one side from the stove or burner 1, and thence extends downwardly, so that the discharge portion of the pipe may be readily moved under the front axle of the automobile to position the discharge end of the pipe closely under the automobile engine, as illustrated in the drawing. The lowermost portion of the pipe is adapted to extend under the front axle of the automobile, with the delivery portion 8 extending upwardly close to the oil pan under the engine. The pipe may be tilted on the caster 11, by raising the stove or corresponding end of the pipe, so as to swing the portion 8 downwardly in order that it may move under the axle in moving the pipe under and withdrawing it from the automobile.

The stove 1 may be located at a distance from the automobile, so as to avoid a fire hazard, and the products of combustion flow through the pipe 5 and are discharged under the engine, so as to heat the engine and other parts.

The heater may be used for keeping an engine warm during freezing weather, or may be used to facilitate starting of the engine.

The pipe 5 may be covered with asbestos or other heat insulating material to avoid loss of heat.

Having thus described the invention, what is claimed as new is:—

1. A heater for automobile engines comprising a movable source of heat, an upwardly-arched pipe connecting with the source of heat, an inversely, arched pipe forming a continuation of the firstnamed pipe for fitting beneath the axle of the automobile and having an open free end portion adapted to fit beneath the crank case of the automobile, and supporting means below said inversely-arched pipe acting as a fulcrum when the handle is lifted whereby to lower the open end of the secondnamed pipe to pass the same beneath the axle of the automobile.

2. In a heating device for automobile engines, a heater supported for rolling motion over the supporting surface, an upwardly-arched pipe connecting with said heater, a second inversely-arched pipe connecting with the firstnamed pipe for extending beneath the axle of the automobile and having an obliquely, elongated open end portion lying in a substantially horizontal plane for fitting relatively closely to and substantially throughout a great area of the crank case of the automobile engine, transversely disposed and spaced partitions in the elongated open end portion of the second pipe for carrying the products of combustion to all portions of the crank case, and a castor at the lower convex portion of the secondnamed pipe for supporting the pipe for rolling motion on the supporting surface and also for acting as a fulcrum when the two combined pipes are tilted by force applied to the handle for the purpose of enabling the open portion of the second pipe to pass beneath the axle of the automobile.

In testimony whereof I hereunto affix my signature.

WALTER SCHOENFELD.